United States Patent [19]

Krol

[11] 4,010,385
[45] Mar. 1, 1977

[54] MULTIPLEXING CIRCUITRY FOR TIME SHARING A COMMON CONDUCTOR

[75] Inventor: William S. Krol, Park Ridge, Ill.
[73] Assignee: Teletype Corporation, Skokie, Ill.
[22] Filed: Jan. 9, 1976
[21] Appl. No.: 647,689
[52] U.S. Cl. .............................. 307/243; 307/251; 307/311; 328/151; 179/15 AW
[51] Int. Cl.[2] ................. H03K 17/54; H04L 15/34
[58] Field of Search .......... 307/243, 256, 251, 311; 178/15 AW, 15 AG, 350; 328/151

[56] References Cited
UNITED STATES PATENTS

| | | | |
|---|---|---|---|
| 2,928,900 | 3/1960 | Pawley | 179/15 AW |
| 3,515,905 | 6/1970 | Raper | 307/256 |
| 3,601,634 | 8/1971 | Ebertin | 328/151 |
| 3,641,366 | 2/1972 | Fujimoto | 307/251 |
| 3,719,832 | 3/1973 | Waaben | 307/243 |
| 3,935,385 | 1/1976 | Thun | 178/50 |

*Primary Examiner*—Stanley D. Miller, Jr.
*Assistant Examiner*—B. P. Davis
*Attorney, Agent, or Firm*—W. K. Serp; M. Pfeffer

[57] ABSTRACT

A multiplexing circuit includes a plurality of passive circuit networks having a multiphase clocking signal associated therewith to selectively enable transmission of information signals over a common conductor. Each passive circuit network is enabled during a distinct phase of the multiphase clocking signal to provide a distinct circuit path for transmission of information signals with each distinct path including the common conductor. The enabling of the passive circuit networks by the multiphase clocking signal allows time sharing of the common conductor.

4 Claims, 3 Drawing Figures

MULTIPLEXING CIRCUITRY FOR TIME SHARING A COMMON CONDUCTOR

BACKGROUND OF THE INVENTION

1. Field of the Invention

This invention relates to a multiplexing circuit for time sharing a common conductor and, more particularly, to a multiplexing circuit which utilizes passive circuit networks in conjunction with multiphase clocking signals to permit information signal transmission while time sharing a common conductor.

2. Description of the Prior Art

In typical multiplexing circuit arrangements, such as is disclosed in U.S. Pat. No. 3,601,634, the number of circuit conductors normally required are reduced by time sharing a common conductor. Howeve, heretofore in utilizing such multiplexiing arrangements, active circuit networks including such devices as transistors, MOSFETS, or FETS have been utilized, in conjunction with necessary passive devices, such as resistors, to provide the gating circuitry necessary to enable time sharing of the common conductor. Consequently, because these active circuit networks have been required, they have contributed signficantly to undesirable cost in implementing the multiplexing circuit arrangement. Therefore, in an effort to reduce the cost of multiplexing circuitry, it become necessary to minimize the active circuit networks required to implement the multiplexing function.

Accordingly, it would be desirable to provide a multiplexing circuit design wherein the number of active circuit networks required to implement the multiplexing functions are comparatively reduced.

SUMMARY OF THE INVENTION

It is therefore an object of this invention to provide a new and improved multiplexing circut for time sharing a common conductor.

It is another object of this invention to provide a multiplexing circuit wherein a minimum of active circuit networks are utilized to implement gating functions necessary to time share a common conductor.

A multiplexing circuit in accordance with the principle of this invention for time sharing a common conductor includes a plurality of passive circuit means which provides signals to be transmitted over the common conductor. A plurality of sampling means corresponding in number to the passive circuit means are provided to receive signals transmitted over the common conductor. A multiphase clocking signal selectively enables each passive circuit means and the corresponding sampling means during a distinct phase of the multiphase clocking signal. This allows the signals from the passive circuit means to be transmitted over the common conductor in a predetermined sequence thereby facilitating the time sharing of the common conductor.

Alternately, a multiplexing circuit in accordance with this invention can also be designed such that a plurality of passive circuit means are provided to receive signals transmitted over the common conductor. The passive circuit means in this embodiment serve as sampling means, thus eliminating the need for additional active sampling networks and still allowing signals transmitted over the common conductor to be transmitted in a predetermined sequence to effectuate the time sharing of the common conductor.

BRIEF DESCRIPTION OF THE DRAWING

Other objects and advantages of the present invention will be apparent from the following detailed description when considered in conjunction with the accompanying drawing in which.

DETAILED DESCRIPTION

Figure 1:
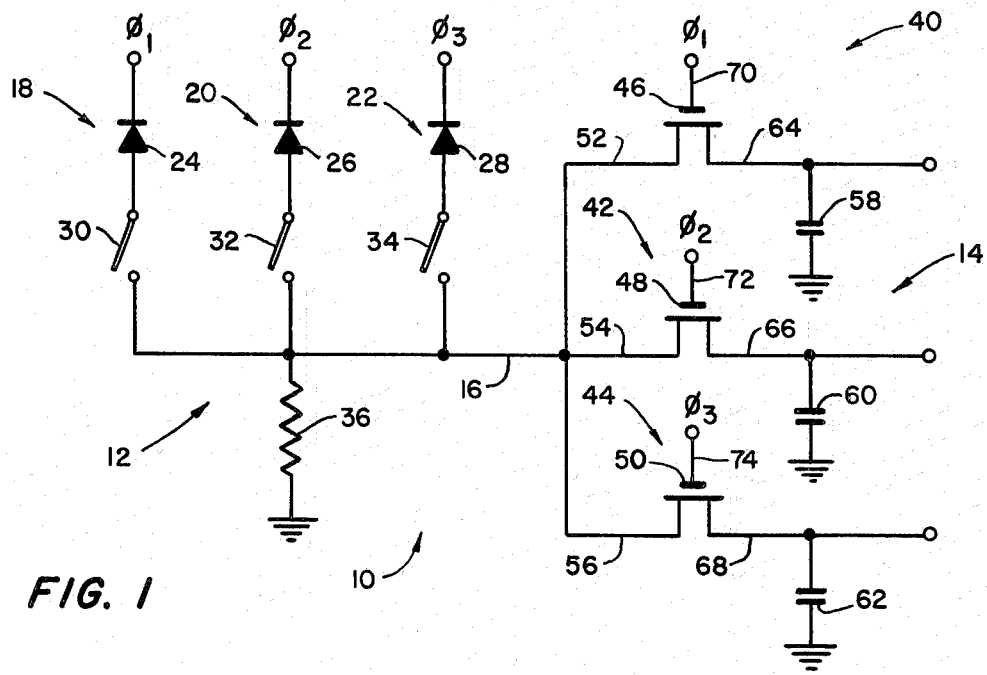
FIG. 1 is a schematic diagram showing a multiplexing circuit embodying certain principles of the invention.

Referring to FIG. 1, a multiplexing circuit designated generally by the numeral 10, includes an input circuit designated generally by the numeral 12, an output circuit designated generally by the numeral 14, and a common conductor 16 which couples the input and the output circuits. The input circuit 12 includes a plurality of passive networks designated generally by the numerals 18, 20, and 22. Included in the passive networks 18, 20, and 22 are a plurality of diodes 24, 26, and 28, respectively, having definite predetermined resistance characteristics established based on the level of signal to be generated in the multiplexing circuit 10. The diodes 24, 26, and 28 are coupled to the common conductor 16 by switches 30, 32, and 34, respectively, which are also included in the passive networks 18, 20, and 22, respectively. It should be understood that the diodes 24, 26, and 28 are only illustrative of the passive devices that may be utilized in this invention. Other well known passive devices, having the desired resistance characteristics, such as resistors, can also be utilized herein and still be within the spirit and scope of this invention. A resistor 36 which is common to each of the passive networks 18, 20, and 22 is connected at one end to circuit common and at the other end thereof to the common conductor 16.

The switches 30, 32, and 34 which are provided in the input circuit 12 allow two states of information i.e., a logic "0" and a logic "1" to be generated by each passive network 18, 20, and 22. The passive networks 18, 20, and 22 are programmed by opening and/or closing the corresponding switches 30, 32, and 34 to form individual voltage divider circuits, formed of the diodes 24, 26, and 28 and the common resistor 36. This arrangement provides signals representing first and second logic states which can be multiplexed over the common conductor 16. For example, if it were desired that passive networks 18, 20, and 22 were to provide signals having logic states "1", "1", and "0", respectively, the passive networks would be programmed as such by closing the switches 30 and 32 and opening the switch 34. This would establish the individual voltage divider circuits, formed of the diodes 24, 26, and 28 and the common resistor 36 which would, in accordance with established electrical circuit principles, provide the desired logic signals upon application of appropriate voltages to the diodes of the passive networks. Similarly, other combinations of logic signals can be provided utilizing the diodes 24, 26, and 28 and the common resistor 36 by selectively closing and/or opening of the switches 30, 32, and 34 depending on the particular logic signals desired.

The output circuit 14 includes a plurality of sampling circuits generally designated by the numerals 40, 42, and 44. The sampling circuits 40, 42, and 44 correspond to the passive networks 18, 20, and 22 respectively, in the input circuit 12. The sampling circuits 40, 42, and 44 include MOSFETS 46, 48, and 50, respectively. Drain electrodes 52, 54, and 56 of the MOSFETS 46, 48, and 50 respectively, are commonly connected to the common conductor from the corresponding passive networks 18, 20, and 22 respectively. Capacitors 58, 60, and 62 are coupled to source electrodes 64, 66, and 68 of the transistors 46, 48, and 50 and are charged through these transistors to provide desired output signals. It is noted that the output circuit 14 can conveniently be implemented on a MOSFET integrated circuit chip or some other similar integrated circuit structure.

Figure 2:
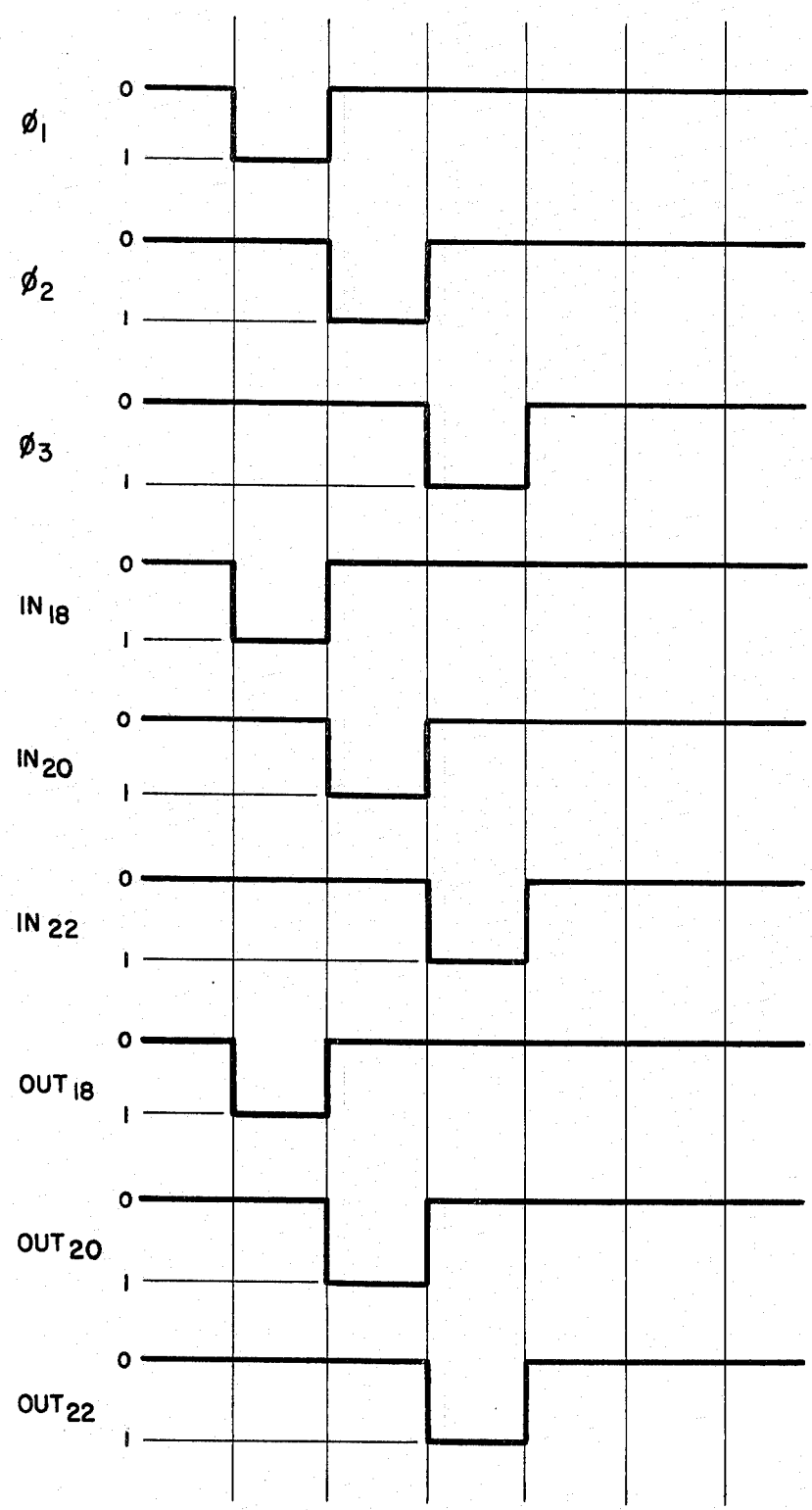
FIG. 2 is a diagram showing the pulses which may be utilized in accordance with the principles of the invention and in addition shows pulses which are developed in the multiplexing circuit of FIG. 1.

A multiphase clocking signal as represented in FIG. 2, includes a plurality of distinct phase signals $\phi_1$, $\phi_2$, and $\phi_3$ which has each of its distinct phase signals coupled to one of the passive networks 18, 20, and 22 respectively. The distinct phase signals $\phi_1$, $\phi_2$, and $\phi_3$ are also coupled to the corresponding sampling circuits 40, 42, and 44 at gate electrodes 70, 72, and 74 of the transistors 46, 48, and 50, respectively. The multiphase clocking signal is generated so that the distinct phase signals $\phi_1$, $\phi_2$, and $\phi_3$ are never at a logic "1", i.e. high, at the same time.

In the multiplexing of signals, in accordance with the invention illustrated in FIG. 1, passive networks 18, 20, and 22 are first programmed by operation of the switches 30, 32, and 34. For example, as is illustrated in phantom in FIG. 1. The switches 30, 32, and 34 have been closed thereby programming the passive networks to individually generate binary input signals having a logic state "1" which are coupled to the conductor 16. When the signal $\phi_1$ which is initially high, is applied to the passive network 18, an input signal In$_{18}$ (FIG. 2) having a logic state "1" is generated by the passive network coupled to the common conductor 16. Since the signal $\phi_1$ is also simultaneously applied to the corresponding sampling circuit 40, the transistor 46 is enabled by the input signal In$_{18}$ which is coupled thereto by the common conductor 16, thereby charging the capacitor 58 to develop an output signal Out$_{18}$ (FIG. 2) at the source electrode 64 of the transistor. Likewise, since the signals $\phi_2$ and $\phi_3$ are low while $\phi_1$ is high the transistors 48 and 50 are not enabled.

When the signal $\phi_2$ is high, the signals $\phi_1$ and $\phi_3$ are low. This causes the passive network 20 to generate an input signal In$_{20}$ (FIG. 2) having a logic state "1" which is coupled to conductor 16. The input signal In$_{20}$ enables the transistor 48 of the sampling circuit 44 thereby charging the capacitor 60 to develop an output signal Out$_{20}$ (FIG. 2) at the source electrode 66 of the transistor.

Similarly, when the signal $\phi_3$ is high, the passive network 22 generates an input signal In$_{22}$ (FIG. 2) having a logic state "1" and the transistor 50 is enabled resulting in the charging of the capacitor 62 to thereby develop an output signal Out$_{22}$ (FIG. 2) at the source electrode 68 of the transistor.

Accordingly, by applying distinct phase signals to the passive networks and by gating corresponding sampling circuits with the same phase signals, distinct input signals, can be generated and transmitted over a common conductor which couples the passive networks and sampling units in a predetermined sequence thereby allowing time sharing of the common conductor.

It should be understood that the particular number of passsive networks shown in the input circuit 12 and the corresponding number of sampling circuits in the output 14 are only for illustrative purposes and that additional passive networks and sampling circuits might be included therein and still be within the spirit and scope of the invention.

Figure 3:
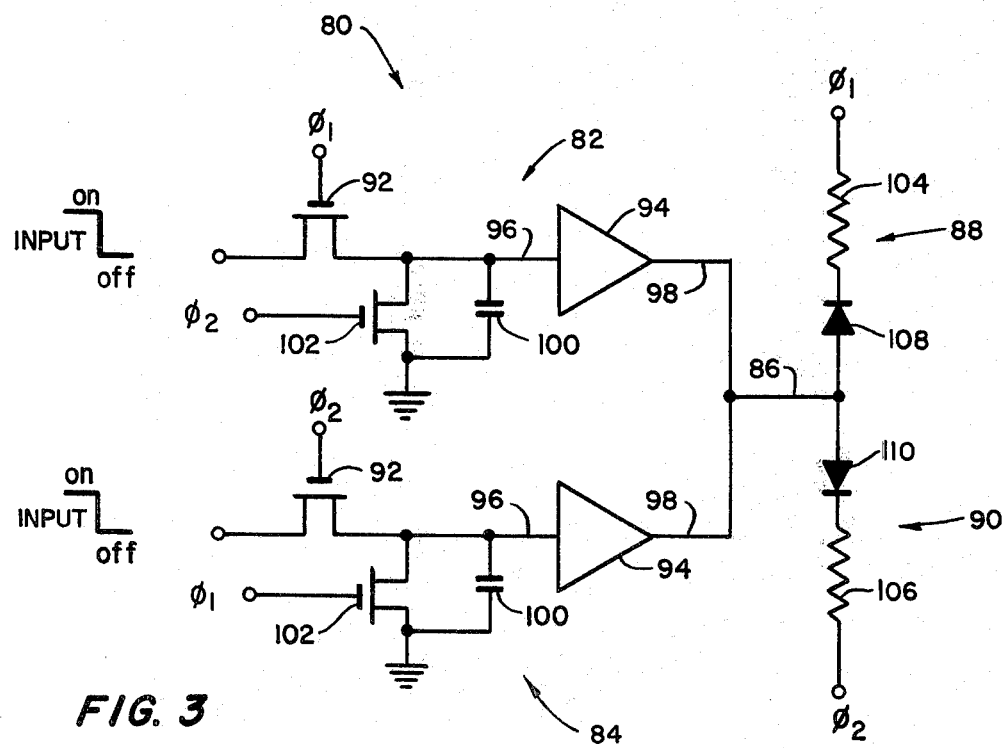
FIG. 3 is a schematic diagram showing another embodiment of a multiplexing circuit in accordance with the invention.

FIG. 3 shows another multiplexing circuit generally designated by the numeral 80 also embodying the principles of this invention. The multiplexing circuit 80, includes a plurality of input drivers generally designated by the numerals 82 and 84 which are coupled via a common conductor 86 to the corresponding passive output circuits generally designated by the numerals 88 and 90. Each input driver 82 and 84 includes a MOSFET 92 and an inverter 94. Inputs 96 of the inverters 94 are coupled to the MOSFET 92 and outputs 98 of the inverters are coupled to the common conductor 86. Capacitors 100 are coupled between the inputs 96 of the inverters 94 and the ground potential, and are charged through the MOSFET 92 to supply an input signal to the inverters. MOSFETS 102 are connected in parallel with the capacitors 100 and provides a discharge path for the capacitors.

The passive output circuits 88 and 90 include a plurality of resistors 104 and 106, respectively, and a plurality of diodes 108 and 110, which may be light emitter diodes or any other suitable resistive devices. The diodes 108 and 110 are enabled in a predetermined sequence by multiplexing signals over the common conductor 86. Distinct phase signals $\phi_1$ and $\phi_2$, for example, as represented in FIG. 2, are coupled to the input drivers 82 and 84, respectively, and to their corresponding output circuits 88 and 90.

In operation, when signal $\phi_1$ is high (FIG. 2) and an input signal is applied to the input of the driver 82 at the MOSFET 92, the inverter 94 associated therewith will couple an enabling signal to the common conductor 86. Since the signal $\phi_1$ is also applied to the corresponding output circuit 88, a return path is provided thereby enabling the diode 108. Similarly, when the signal $\phi_2$ is high and simultaneously applied to the input driver 84 and the output circuit 90, an input signal will enable the inverter 98 to couple an establishing signal to the common conductor 86, thereby providing a return path and enabling the diode 110.

By utilizing passive circuit networks in conjunction with appropriate multiphase signals as set forth in the invention described herein, the number of required active circuit networks which have been customarily used in the inputs and outputs of multiplexing circuits can be reduced.

It is to be understood that the above-mentioned embodiments are simply illustrative of this invention. Other embodiments may be devised by those skilled in the art which will embody the principles of the invention and fall within the spirit and scope thereof.

What is claimed is:

1. A multiplexing circuit for time sharing signals over a common conductor comprising:
   a plurality of individual passive circuit paths each having a predetermined resistance characteristic with one end of each circuit path being connected to a common conductor;
   a plurality of sampling circuits each corresponding to one of said passive circuit paths, each of said sampling circuits being connected to said common conductor;

means for applying a distinct phase of a multiphase clock signal to each of said passive circuit paths for coupling to said common conductor and for applying the same phase of said multiphase clock signal to the corresponding sampling circuit; and a selectively operable switch connected in series with each of said passive circuit paths for interrupting the coupling of the associated clock phase to the common conductor so that each of the sampling means will provide a signal related to the condition of the switch in its corresponding passive circuit path.

2. The multiplexing circuit of claim 1 which further includes a common resistor coupled to said common conductor and to the common terminal of said multiphase clock signal applying means so that the predetermined resistance characteristic of each of said passive circuit paths forms a voltage dividing network with said common resistor.

3. The multiplexing circuit of claim 2 wherein each of said passive circuit paths includes a diode.

4. A multiplexing circuit for time sharing a common conductor comprising:

a plurality of means for generating signals to be transmitted over the common conductor;

a plurality of passive circuit paths each of which corresponds to one of the generating means with one end of each passive circuit path being connected to said common conductor;

means for applying a distinct phase of multiphase clock signal to each of said generating means for selective enablement thereof and for applying the same phase of said multiphase clock signal to the corresponding passive circuit path; and each of said passive circuit paths including a resistor and a light emitting diode in series connection, the light emitting diode providing a suitable indication in response to a signal from the corresponding generating means during the related clock phase.

* * * * *